(12) United States Patent
Evans et al.

(10) Patent No.: US 12,475,869 B2
(45) Date of Patent: Nov. 18, 2025

(54) AUDIO GENERATION USING GENERATIVE ARTIFICIAL INTELLIGENCE MODEL

(71) Applicant: Stability AI Ltd, London (GB)

(72) Inventors: Zach Evans, Bellevue, WA (US); Julian Parker, London (GB); CJ Carr, Medford, MA (US); Zachary Zukowski, Sacramento, CA (US); Josiah Taylor, Stafford (GB); Jordi Pons, Sabadell (ES)

(73) Assignee: Stability AI Ltd, London (GB)

( * ) Notice: Subject to any disclaimer, the term of this patent is extended or adjusted under 35 U.S.C. 154(b) by 0 days.

(21) Appl. No.: 19/216,171

(22) Filed: May 22, 2025

(65) Prior Publication Data
US 2025/0322817 A1 Oct. 16, 2025

Related U.S. Application Data

(63) Continuation of application No. 18/883,212, filed on Sep. 12, 2024.

(60) Provisional application No. 63/633,019, filed on Apr. 11, 2024.

(51) Int. Cl.
*G10H 1/00* (2006.01)

(52) U.S. Cl.
CPC ..... *G10H 1/0025* (2013.01); *G10H 2250/145* (2013.01); *G10H 2250/215* (2013.01); *G10H 2250/311* (2013.01); *G10H 2250/571* (2013.01); *G10H 2250/631* (2013.01)

(58) Field of Classification Search
CPC ....... G10H 2250/145; G10H 2250/215; G10H 2250/261; G10H 2250/311; G10H 2250/571; G10H 2250/611; G10H 2250/631
See application file for complete search history.

(56) References Cited

U.S. PATENT DOCUMENTS

| | | | |
|---|---|---|---|
| 5,913,190 A * | 6/1999 | Fielder | G11B 27/031 704/229 |
| 8,626,494 B2 * | 1/2014 | Van den Berghe | G11B 20/00007 704/500 |
| 11,341,945 B2 * | 5/2022 | Bretan | G06F 18/24147 |
| 11,915,689 B1 * | 2/2024 | Agostinelli | G10L 15/16 |
| 12,354,576 B2 * | 7/2025 | Wang | G10H 1/0025 |
| 2022/0406323 A1 * | 12/2022 | Kadioglu | G06N 3/048 |
| 2024/0153475 A1 * | 5/2024 | Valadez | G10H 1/12 |
| 2024/0290308 A1 * | 8/2024 | Balassanian | G10H 1/0025 |
| 2025/0006208 A1 * | 1/2025 | Potter | G06N 3/088 |
| 2025/0279105 A1 * | 9/2025 | Yang | G10L 21/0272 |

* cited by examiner

Primary Examiner — Christopher Uhlir
(74) Attorney, Agent, or Firm — Kilpatrick Townsend & Stockton LLP

(57) ABSTRACT

A method. The method including receiving a prompt describing desired characteristics of audio. The method further including generating, using a set of machine learning models and based on the prompt, a latent space representation of the audio at a latent rate less than 40 Hz. The method further including generating, using the set of machine learning models and the latent space representation of the audio, an audio file at an output rate greater than the latent rate. The audio file including the audio based on the latent space representation of the audio. The audio having a length greater than 90 seconds.

20 Claims, 9 Drawing Sheets

AUDIO GENERATION USING GENERATIVE ARTIFICIAL INTELLIGENCE MODEL

CROSS-REFERENCES TO RELATED APPLICATIONS

This application is a continuation of and claims the benefit of priority to U.S. Non-Provisional application Ser. No. 18/883,212, filed on Sep. 12, 2024, entitled "AUDIO GENERATION USING GENERATIVE ARTIFICIAL INTELLIGENCE MODEL," which claims the benefit of priority to U.S. Provisional Application No. 63/633,019, filed on Apr. 11, 2024, entitled "AUDIO GENERATION USING GENERATIVE ARTIFICIAL INTELLIGENCE MODEL," the contents of which are herein incorporated by reference in their entirety for all purposes.

BACKGROUND

Artificial Intelligence (AI) models (e.g., machine learning (ML) models) can be used to generate output based on received natural language input prompts. Some AI models can be used to generate audio output based on natural language input prompts. For example, machine learning model may receive a prompt of a user, where the prompt asks the model to "generate some classical music." In response, the machine learning model may generate a short audio file that includes classical music generated based on the prompt.

BRIEF DESCRIPTION OF THE DRAWINGS

Various embodiments in accordance with the present disclosure will be described with reference to the drawings, in which.

DETAILED DESCRIPTION

Figure 1:
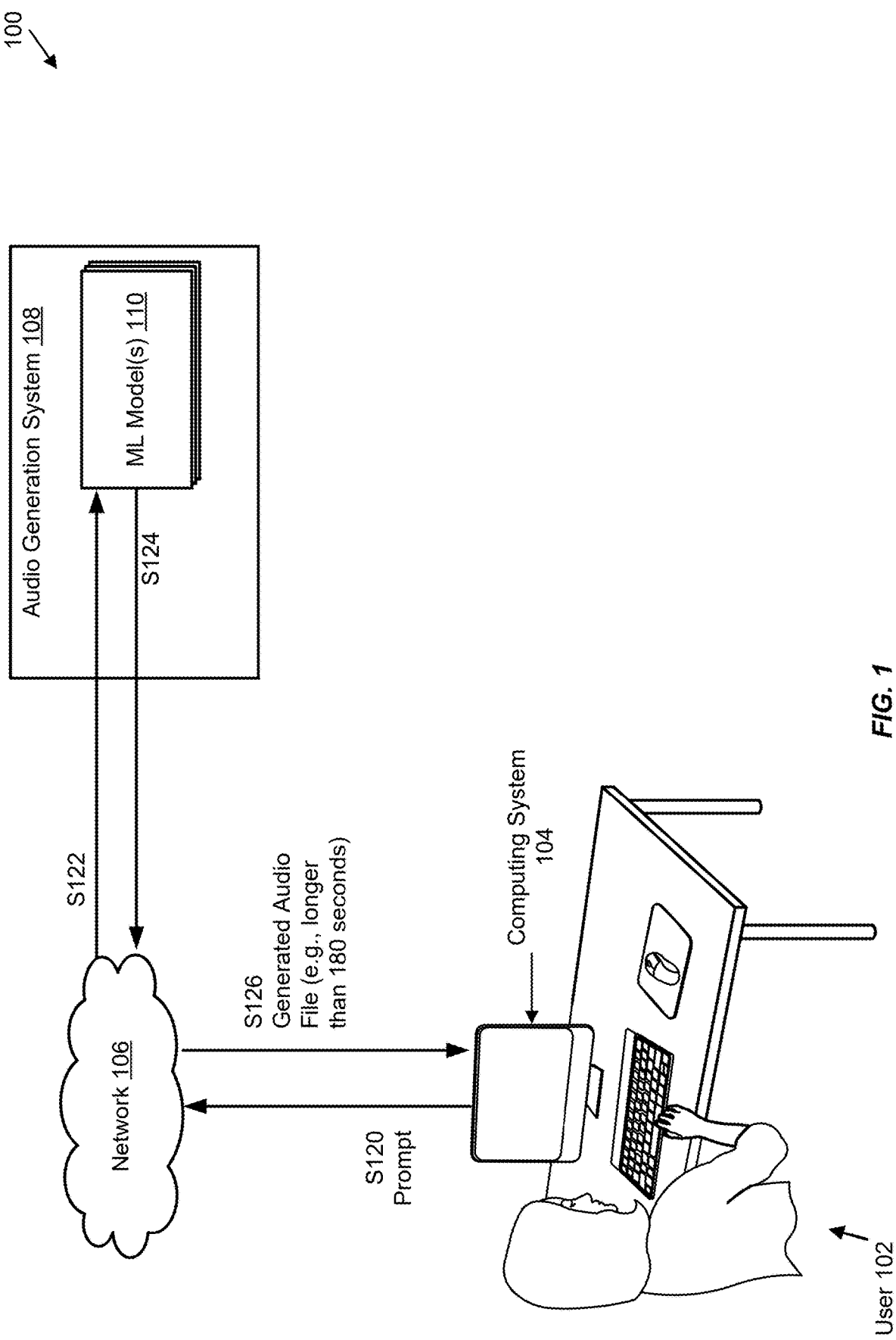
FIG. 1 illustrates an example of using an audio generation system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Machine learning (ML) models can have challenges with generating longer audio files and audio files that mimic natural music structure. Embodiments of the present disclosure relate to techniques for generating audio given a prompt. The prompt may include text, audio, video, and/or an image and the generated audio may include speech, music, and/or sound effects, etc. The embodiments include techniques for generating the audio using the prompt and can use latent diffusion models. The latent diffusion models can generate latent space representations at a latent rate (measured in Hertz) that is lower than a sampling rate of audio and thereby reduce the memory consumption for latent space representations of audio compared to traditional approaches. In an example, the prompt may influence the generation of the audio by including an image for the audio to correspond to or including instructions that may, in certain examples, define a length, a genre, and/or one or more instruments to include in the audio. Certain embodiments can be capable of generating long form audio (e.g., at least 90 seconds long, as long as 285 seconds in length) that include a structure (e.g., including an intro, a verse, a pre-chorus, a chorus, a bridge, a hook, a refrain, an instrumental break, and/or an outro). The long form audio generated can be produced due to achieving low latent rates. Certain embodiments can generate one or more audio channels that may be combined to create an audio track. Such embodiments are described in further detail herein, among other embodiments.

Improvements can be made as to what can be generated with a machine learning model (e.g., long form audio, audio with a structure), how training of the machine learning model occurs, and how input can affect generated audio output from the machine learning model. For example, improvements may enable generation of an audio file longer than four and a half minutes using natural language instructions that describe audio requirements. In another example, improvements may enable generation of an audio file with a structure using a prompt that includes natural language instructions, an image, and/or a video that inform the generation of generated audio. The improvements may also enable larger and/or more complex data to be embedded into a latent space where the data can be represented using vectors.

Further, improvements can enable prompts (e.g., simple prompts) to be received and used to create complex audio (e.g., audio with different instruments, a structure, a long length, multiple channels, vocals and instruments, etc.). As an example, a user may not know how to play a single instrument. With the audio generation system described herein, the user may be able to generate audio they could not otherwise generate. For example, the user may be able to generate audio that includes sounds like those from a guitar even though the user does not know how to play the guitar and/or own a guitar. Certain embodiments can allow the user to generate audio that includes more than one instrument, which can expand the ability of a user who may know how to play one instrument to generate audio that includes other instruments.

Furthermore, improvements can enable a user with little technical experience in recording and/or producing audio to produce audio. As an example, the user may know how to play an instrument (e.g., have creative experience) but may not know how to capture, mix, and/or reproduce audio. With the audio generation system described herein, the user may be able to generate audio they could not otherwise generate due to their lack of technical know how relating to audio engineering.

Using the above techniques, prompt engineering improvements are enabled. The embodiments provide for various improvements. For example, the improvements can include resource utilization and energy improvements, as less time and resources may be used to compose, record, and edit audio. Further, the disclosed techniques may generate audio with fewer errors than similar audio could be by a human (e.g., due to physical instrument and/or human constraints and/or accuracy in audio engineering). Furthermore, the disclosed techniques can use less memory than previous audio generation techniques by operating using a latent space where audio can be represented in vector space. The reduction in memory usage can reduce the processing resources, network resources, and/or storage resources required by the system compared to previous audio generation systems.

FIG. 1 illustrates an example of using an audio generation system 108, according to embodiments of the present disclosure. The audio generation system 108 may be used as part of an audio creation system 100. The audio creation system 100 may include a computing system 104, a network 106, and the audio generation system 108. The audio generation system 108 may receive a prompt (e.g., a natural language prompt) from the computing system 104 that causes an audio file to be generated using one or more machine learning (ML) models 110. The generated audio file may be transmitted to the computing system 104 and presented by a user interface.

The computing system 104 may be a user device (e.g., laptops, personal computers, phones, etc.). The computing system 104 may be a server. The computing system 104 may be capable of receiving input from a user 102 via, for example, a user interface. In certain embodiments, the input received by the computing system 104 includes the prompt. The input may cause the computing system 104 to transmit the prompt to the audio generation system 108 (e.g., via the network 106). As an example, a user interface of the computing system 104 may receive a natural language prompt (e.g., from user 102) that describes desired characteristics of audio to be included in a generated audio file, and the natural language prompt may be transmitted to the audio generation system 108 via the network 106.

The prompt may include text (e.g., natural language text) that describes desired characteristics of audio to generate such as a length (e.g., 4 minutes, over 4 minutes), a mood (e.g., uplifting, mellow, intense, etc.), a tempo (e.g., slow, fast, brisk, steady, etc.), a style (e.g., classical, rock, jazz, blues, country, etc.), an instrumentation (e.g., brass, woodwind, piano, guitar, keyboard, electronic, solo, trio, etc.), a structure (e.g., an intro, a verse, a pre-chorus, a chorus, a bridge, a hook, a refrain, an instrumental break, and/or an outro).

The prompt may include at least one of a text, an audio, an image, and/or a video. In some embodiments, text and/or audio may describe desired characteristics of audio to generate. In some embodiments, text may describe a scene (e.g., a scene from a book or a script) that can then be used to generate audio that corresponds to the text. In some embodiments, audio, image(s), and/or a video can be included in the prompt to cause the audio generation system 108 to generate audio corresponding to the audio, image(s), and/or video. For example, a portion of a song may be included in the prompt and audio may be generated that includes the portion or similar characteristics as the portion. In another example, a video scene from a movie may be included in the prompt and audio that could be played in the background of the scene can be generated by the audio generated system 108.

The prompt may include direction for one or more channels to be included in the generated audio file. The generated audio file may include one or more channels. Each prompt may cause one or more channels to be generated by the audio generation system 108. Each channels may independently represent sound. In an example, a first channel includes a guitar instrumental and a second channel includes vocals. In the example, the two channels may be overlaid/combined to create an audio file where vocals and guitar are each heard at the same time and/or different times throughout the audio file being played. In another example, a single channel (which can be referred to as "mono sound") may be prompted and generated. In yet another example, stereo sound (e.g., two audio channels, one for left side playback and one for right side playback) may be requested in the prompt and generated by audio generation system 108.

The prompt may be used as input to the audio generation system 108 to cause an audio file to be generated. The audio generation system 108 may use a set of one or more machine learning models 110 to generate the audio using the prompt. The set of one or more machine learning models 110 may include an embedding model, a decoder model, and/or a latent diffusion model (e.g., a diffusion transformer model). Training and using such models are described in further detail herein.

The generated audio file may include one or more channels, as described above. The generated audio file may have a predefined length, a predefined max length, and/or or a length defined by the prompt. The audio generation system 108 may transmit the generated audio file to the computing system 104 for presentation (e.g., for audio output, for presenting as a downloadable file).

By using the computing system 104 to present the generated audio file to the user 102, the user 102 may listen to the audio represented by the generated audio file. Computing system 104 may store the generated audio file in memory, send the audio file to another computing system (e.g., social media application, a different user device, etc.). In some embodiments, subsequent prompts may be received (e., from computing system 104 or another computing system) by the audio generation system 108 to cause the audio generation system 108 to alter the generated audio file.

The network 106 may be configured to connect the computing system 104 and the audio generation system 108, as illustrated. The network 106 may be configured to connect any combination of the system components. In certain embodiments, the network 106 is not part of the audio creation system 100. For example, the audio generation system 108 may run locally on the computing system 104 and/or one or more of the set of ML models 110 may run locally on computing system 104.

Each of the network 106 data connections can be implemented over a public (e.g., the internet) or private network (e.g., an intranet), whereby an access point, a router, and/or another network node can communicatively couple the computing system 104 and the audio generation system 108. A data connection between the components can be a wired data connection (e.g., a universal serial bus (USB) connector), or a wireless connection (e.g., a radio-frequency-based connection). Data connections may also be made through the use of a mesh network. A data connection may also provide a power connection. A power connection can supply power to the connected component. The data connection can provide for data moving to and from system components. One having ordinary skill in the art would recognize that devices may be communicatively coupled through the use of a network (e.g., a local area network (LAN), wide area network (WAN), etc.). Further devices may be communicatively coupled through a combination of wired and wireless means (e.g., wireless connection to a router that is connected via an ethernet cable to a server).

The interfaces between components communicatively coupled with the audio creation system 100, as well as interfaces between the components within the audio creation system 100, can be implemented using web interfaces and/or application programming interfaces (APIs). For example, the computing system 104 can implement a set of APIs for communications with the audio generation system 108, and/or user interfaces of the computing system 104. In an example, the computing system 104 uses a web browser during communications with the audio generation system 108.

The audio creation system 100 illustrated in FIG. 1 may further implement the illustrated steps S120-S126. The illustrated steps may be implemented by executing instructions stored in a memory of the audio creation system 100, where the execution is performed by processors of the audio creation system 100.

At step S120, a prompt may be transmitted from the computing system 104 to the network 106. The prompt may include information received from a user interface of the computer system 104. For example, user 102 may have typed: "Please create a jazz song that is sad at the start and happy at the end" and the prompt may reflect the entered information and be transmitted to the network 106.

At step S122, the prompt may continue to be transmitted to the audio generation system 108 from the computing system 104 via the network 106. After the audio generation system 108 receives the prompt, the audio generation system 108 may use the one or more machine learning models 110 to generate the generated audio file using the prompt.

At step S124, the audio generation system 108 may transmit the generated audio file to the network 106.

At step S126, the network 106 may transmit the generated audio file to the computing system 104. Upon the computing system 104 receiving the generated audio file, the computing system 104 may present the generated audio file or portions thereof using the user interface of computing system 104. For example, the user 102 may be presented with and be able to view different channels of the generated audio file. In an example, the user interface of computing system 104 may allow the user 102 to drill into/expand a specific audio channel or subset of audio channels and enable or disable them from being output from speakers.

Figure 2:
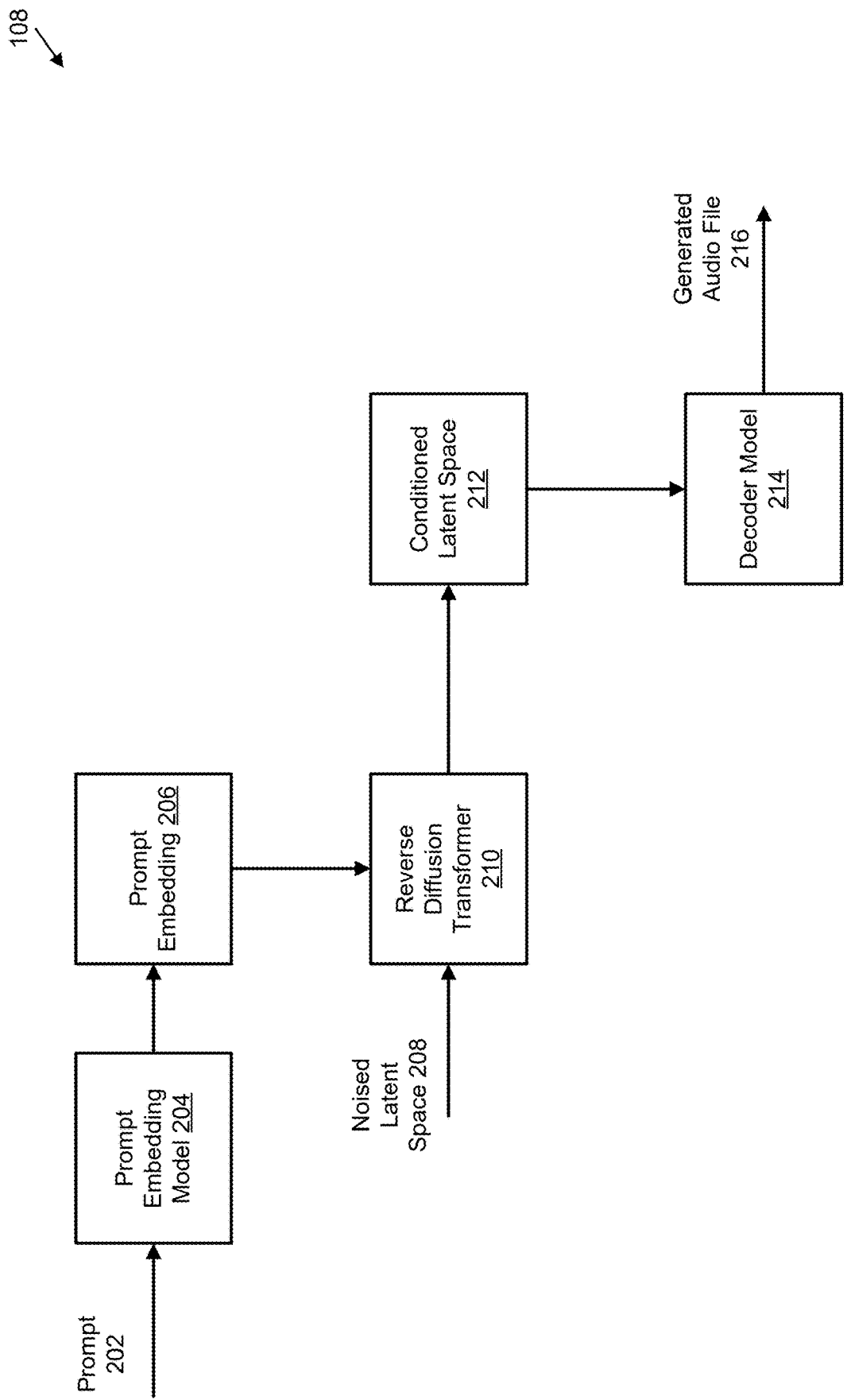
FIG. 2 illustrates an example of an audio generation system, according to embodiments of the present disclosure.

FIG. 2 illustrates an example of an audio generation system 108, according to embodiments of the present disclosure. The audio generation system 108 may be the audio generation system 108 described with respect to FIG. 1. The audio generation system 108 may be configured to receive a prompt 202 and output a generated audio file 216. The audio generation system 108 may include a prompt embedding model 204, a reverse diffusion transformer 210, and a decoder model 214.

The prompt 202 may be transmitted from a computing system (e.g., computing system 104, described above). Prompt 202 may be received from a system (e.g., via a network). Prompt 202 may be received by a user interface of the system. Prompt 202 may describe the desired characteristic of audio to be generated by the audio generation system 108. For example, a length, a mood, a genre, instruments to be included, a number of channels, etc. Prompt 202 may be received by the prompt embedding model 204.

The prompt embedding model 204 may be configured to represent prompt 202 in a multi-dimensional space (e.g., a vector space). The prompt embedding model 204 may include neural network layers to convert prompt 202 into a prompt embedding 206 in the high dimensional space. The neural network layers used to generate prompt embedding 206 may be referred to as embedding layers. The prompt embedding model 204 may be configured and/or previously trained to generate embeddings for prompts that are represented as text, audio, an image, and/or video. Prompt embedding model 204 may be a contrastive text-audio embedding model (e.g., based on CLAP), a T5 model, a convolutional neural network transformer, or a recurrent neural network. One of ordinary skill in the art with the benefit of the present disclosure would recognize other ML models that may be used as prompt embedding model 204.

In certain embodiments, the prompt embedding model 204 may be trained to generate prompt embeddings for prompts that include one or more types of information. For example, a first prompt embedding model may be trained and used to generate a first embedding for natural language prompts and a second prompt embedding model may be trained and used to generate a second embedding for a prompt that includes an image and natural language. In certain embodiments, one of multiple prompt embedding models may be selected for use based on input to the audio generation system 108. The input may be prompt 202 and/or user input. Prompt embedding 206 may be stored in memory (e.g., memory of the audio generation system 108). Prompt embedding 206 may be used as input to the reverse diffusion transformer 210.

The reverse diffusion transformer 210 may receive prompt embedding 206 and a noised latent space 208 as input. Reverse diffusion transformer 210 may be a machine learning model trained to generate a conditioned latent space (e.g., conditioned latent space 212) using a noisy latent space (e.g., noised latent space 208). Techniques for training reverse diffusion transformer 210 are described in further detail herein. The conditioned latent space 212 may be generated using a combination of prompt embedding 206 and noised latent space 208. At least a portion of prompt embedding 206 and noised latent space 208 may be combined before being input to reverse diffusion transformer 210. For example, at least a portion of the prompt embedding may be prepended to noised latent space 208. At least a portion of prompt embedding 206 and noised latent space 208 may be combined with a latent space derived from noised latent space 208. For example, cross attention may be used by reverse diffusion transformer to use at least a portion of prompt embedding 206 during inference of reverse diffusion transformer 210.

Noised latent space 208 may be a latent space that includes randomly generated noise. Noised latent space 208 may be generated based on sampling values according to a distribution (e.g., a gaussian distribution). Noised latent space 208 may be generated based on a seed. The seed may be input to the audio generation system 108 (e.g., via a user interface). Noised latent space 208 may be stored in memory and used by reverse diffusion transformer 210.

Reverse diffusion transformer 210 may generate conditioned latent space 212 by removing noise from noised latent space 208. Reverse diffusion transformer 210 may iteratively remove noise from noised latent space 208 to obtain the conditioned latent space 212. Conditioned latent space 212 generated by reverse diffusion transformer 210 may be generated at a given latent rate. The latent rate may be measured in Hertz (Hz). In certain embodiments, the latent rate may be predefined. The latent rate may be less than 40 Hz. In certain embodiments, the latent rate may be between 20 Hz and 25 Hz. A lower latent rate can cause conditioned latent space 212 to occupy less space in memory compared to a higher latent rate. Conditioned latent space 212 can be considered to be an encoded form of an audio file (e.g., the generated audio file 216). Conditioned latent space 212 may be stored in memory of audio generation system 108.

Decoder model 214 may receive conditioned latent space 212 as input and use conditioned latent space 212 to generate the audio represented in the generated audio file 216. Decoder model 214 may be trained using techniques described further herein. Decoder model 214 may be configured to receive conditioned latent space 212 at a first latent rate and output the generated audio file 216 at an output rate. The output rate may be greater than the first latent rate. For example, the output rate may be above 40 kHz. Decoder model 214 may include neural network layers that are used to generate audio from an encoding of audio (e.g., conditioned latent space 212). Decoder model 214 may include a recurrent neural network, a long short term memory network, a transformer model, a convolutional neural network, or another model architecture. One of ordinary skill in the art with the benefit of the present disclosure would recognize other architectures that may be used for decoder model 214.

The generated audio file 216 may be generated by decoder model 214 and may be output from the audio generation system. The generated audio file 216 may represent audio generated by the audio generation system 108. In some embodiments the generated audio has a length greater than 90 seconds and/or longer than 180 seconds. The audio included in the generated audio file 216 may be defined by the characteristics that were described by prompt 202 and/or otherwise influenced by prompt 202.

The generated audio in the generated audio file 216 may have a structure. The structure may include two or more of an intro, a verse, a pre-chorus, a chorus, a bridge, a hook, a refrain, an instrumental break, an/or an outro. Audio with less than two of a verse, a pre-chorus, a chorus, a bridge, a hook, a refrain, an instrumental break, an/or an outro can be generated by the audio generation system 108 but may not be said to have a structure because structured audio may be dependent on the audio having more than one parts combined into the audio.

The generated audio in the generated audio file 216 may include any combination of music, voice, instrumental, and/or sound effect audio. The audio may include one or more channels. The channels can be represented independently of the other channels, as described above. For example, a first channel may be played back or saved independently of a second channel. The first channel and the second channel may be appended and/or overlaid with one another to generate the audio.

In some embodiments, noised latent space 208 may be initialized with audio during sampling. Reverse diffusion transformer 210 may perform some degree of style-transfer for noised latent space 208 (e.g., audio-to-audio). This capability can be used to modify the aesthetics of an existing audio recording based on a prompt 202, whilst maintaining the existing audio's structure (e.g., a beatbox recording could be style-transferred to produce realistic-sounding drums). As a result, the audio generation system 108 can be influenced by audio inputs, enhancing its controllability and expressiveness.

In some embodiments, the generated audio file may include audio in combination with an image or a video. For example, if a video is included in prompt 202, the generated audio file may include the video and the generated audio.

Figure 3:
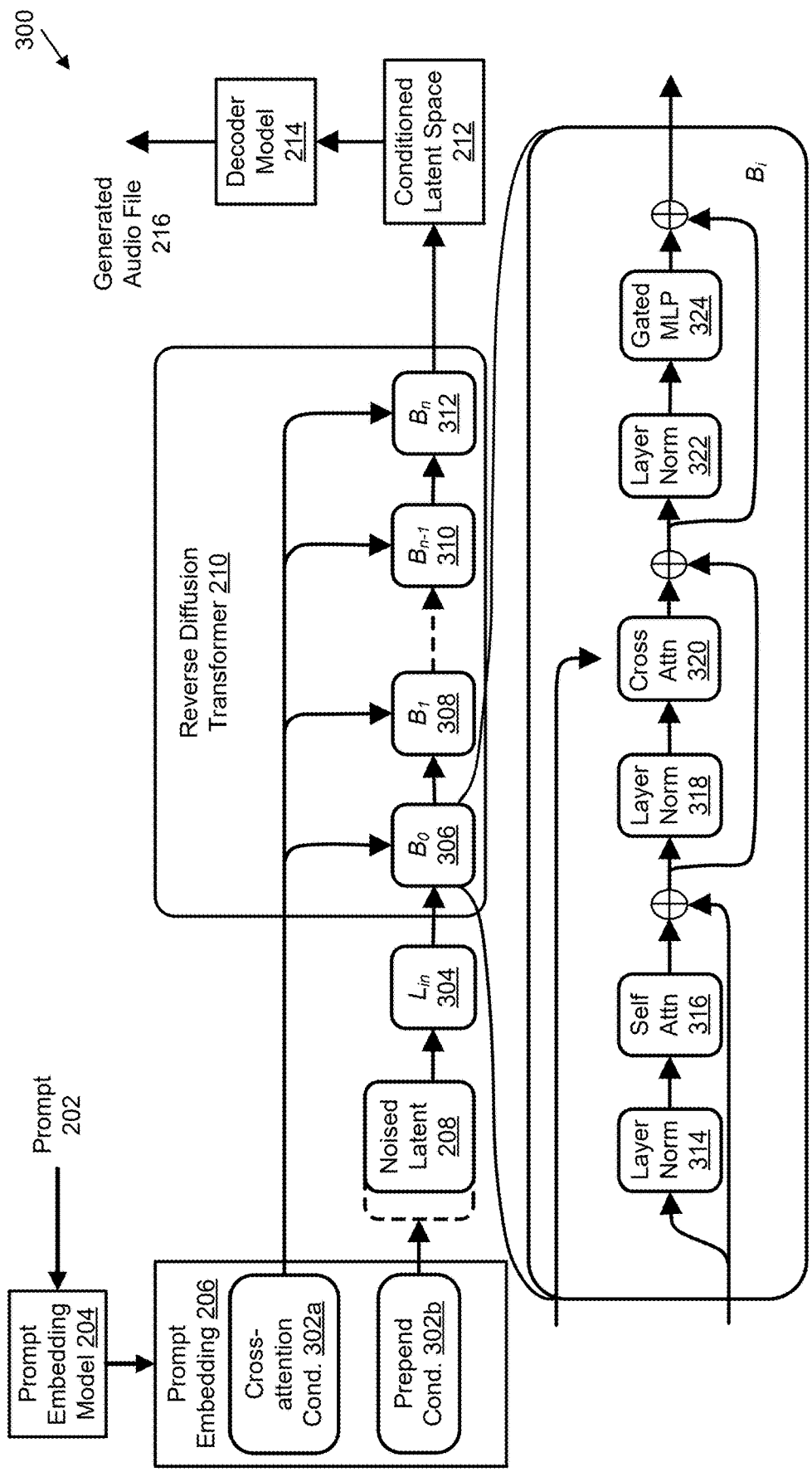
FIG. 3 illustrates an exemplary audio generation system, according to embodiments of the present disclosure.

FIG. 3 illustrates an exemplary audio generation system 300, according to embodiments of the present disclosure. System 300 is an example of audio generation system 108. Exemplary audio generation system 300 is configured to receive prompt 202 and output, using a set of machine learning models, a generated audio file 216 based on prompt 202. Exemplary audio generation system 300 can include a prompt embedding model 204, a reverse diffusion transformer 210, and a decoder model 214, each of which may be the respective prompt embedding model 204, reverse diffusion transformer 210, and decoder model 214 described above.

Prompt embedding model 204 may receive prompt 202 and use prompt 202 to generate a prompt embedding 206. Prompt embedding model 204 may be a contrastive text-audio embedding model. Prompt embedding model 204 may be based on contrastive language-audio pretraining (CLAP) and the prompt embedding 206 may be used for text conditioning. Prompt embedding model 204 may be a hierarchical token-semantic audio transformer (HTSAT) based audio encoder model. Prompt embedding model 204 may use feature fusion to further enable prompt embedding model 204 to process audio inputs of variable lengths and enhance the model performance. Prompt embedding model 204 may, additionally or alternatively, include a robustly optimized bidirectional encoder representations and transformers (BERT) training approach (RoBERTa)-based text encoder model. The RoBERTa model builds on BERT and modifies key hyperparameters, removing the next-sentence pretraining objective and training with much larger mini-batches and learning rates. The HTSAT and RoBERTa models may be trained from scratch on a dataset with a language-audio contrastive loss. Prompt embedding model 204 can use a next-to-last hidden layer of the CLAP text encoder as prompt (e.g., text) features.

The prompt embedding 206 generated by prompt embedding model 204 may be used to perform conditioning. Conditioning can influence a conditioned latent space 212 that is output by reverse diffusion transformer 210 and thereby influence the generated output audio file 216 output by decoding conditioned latent space 212. The reverse diffusion transformer 210 may be conditioned by text, timing, and timestep signaling. The text conditioning (e.g., prompt embedding 206) may enable natural language control. The timing conditioning may enable variable-length generation. The timing conditioning may be calculated using sinusoidal embeddings and included via cross-attention and/or prepend conditioning. Timing conditioning can be prepended before the reverse diffusion transformer 210. The timestep signaling may indicate the current timestep of the diffusion process (e.g., represented as sinusoidal encodings of the current timestep of the diffusion process). The timestep signaling can be prepended before the reverse diffusion transformer 210.

The conditioning may include cross attention (e.g., cross attention conditioning 302a). Cross-attention conditioning 302a can be used to bridge the interaction between the diffusion network of reverse diffusion transformer 210 and the prompt embedding 206. Cross attention conditioning 302a can include latent space (e.g., embedding of the prompt) conditioning and the timing conditioning.

The timing conditioning and/or timestep signaling (e.g., prepend conditioning 302b) can be prepended to a noised latent space 208 (e.g., noised latent space 208, described above) before reverse diffusion transformer 210 is used with the noised latent space. The noised latent space 208 that the timing conditioning and/or timestep signaling is prepended to may be randomly generated. After the noised latent space 208 includes the prepend conditioning 302b, it may be referred to as "latent space in" 304 ($L_{in}$ 304). In some embodiments, other types of conditioning may be used.

Reverse diffusion transformer 210 may use $L_{in}$ 304 to generate conditioned latent space 212. Additionally, reverse diffusion transformer 210 may use the cross attention conditioning 302a to inform the generation of conditioned latent space 212.

Reverse diffusion transformer 210 may include stacked blocks ($B_0$ 306, $B_1$ 308, through $B_{n-1}$ 310, and $B_n$ 312). The stacked blocks may include serially connected attention layers. For example, block $B_0$ 306 is illustrated as including self attention layer 316 and cross attention layer 320. The self attention layer 316 may be used to capture dependencies and relationships within the input sequence (e.g., $L_{in}$ 304) and can allow reverse diffusion transformer 210 to identify and weigh the importance of different parts of the input sequence by attending to itself. The cross attention layer 320 can enable the reverse diffusion transformer 210 to mix two different embedding sequences. For example, cross attention layer 320 can combine the embedding from a previous block or normalization layer (e.g., layer norm 318) with the cross attention conditioning embedding 302a from prompt embedding 206.

The serially connected attention layers may include skip connections around each attention layer. The skip connections can help address a vanishing gradient problem by allowing gradients to flow more directly.

The stacked blocks may include gated multi-layer perceptrons (MLPs). For example, block $B_0$ 306 is illustrated as including gated MLP 324. MLP 324 can be configured to perform multiple layers of nonlinear transformations on input.

Layer normalization (e.g., layer norm 314, layer norm 318, layer norm 322) may be used at the input to the attention layers and/or a MLP. Layer normalization can be used to cause neurons in a common layer to have the same normalization term (e.g., same mean and same variance). Layer normalization can enable smoother gradients, faster training, and greater accuracy by normalizing the distributions of intermediate layers.

Transformer attention layers have a rotary positional embedding applied to the lower half of the embedding. Each transformer block B can contain at least one cross attention layer 320 to incorporate conditioning. Linear mappings are used at the input and output of the reverse diffusion transformer 210 to translate from a latent space with the dimensions of $L_{in}$ 304 to the conditioned latent space 212 with dimensions of the reverse diffusion transformer 210 that can be decoded by decoder model 214. Efficient block-wise attention and gradient checkpointing can be used to reduce the computational and memory impact of applying a transformer architecture over longer sequences.

Reverse diffusion transformer 210 may be configured to generate content within a specified window length (e.g., 3 minutes and 10 seconds or 4 minutes and 45 seconds) and may rely on the timing conditioning to fill the signal up to a predefined length (e.g., predefined by the audio generation system, predefined by the prompt 202). Reverse diffusion transformer 210 can be trained to fill the rest of the output conditioned latent space 212 with silence. In some embodiments, to generate conditioned latent space 212 with a length shorter than a predefined audio generation system window length and/or without silence, the output (e.g., generated audio file 216) from the audio generation system may be trimmed (e.g., by another system, by a user device) after being output by audio generation system.

Decoder model 214 may be configured to decode an input latent space to generate an audio file (e.g., an output waveform). Decoder model 214 may be configured to decode a latent space with the same dimensions as conditioned latent space 212 generated by reverse diffusion transformer 210.

Decoder model 214 may process the conditioned latent space 212 using a series of convolutional blocks, each of which perform upsampling and channel contraction via transposed strided convolutions (e.g., at the start of each upsampling block). Before each upsampling block, a series of residual network (ResNet) like layers can be used to contract convolutions and Snake activation functions for further processing. Convolutions may be parameterized in a weight-normalized form. The Snake activation functions may include a trainable β parameter, which controls the magnitude of the periodicity in the activation. Decoder model 214 may not include a tanh( ) function call at the output of the decoder model 214 to reduce harmonic distortion from being introduced into the signal.

The generated audio file 216 output from decoder model 214 may be transmitted to a system. The system may be the system (e.g., a user device) that provided prompt 202 to the audio generation system and/or another system.

Figure 4:
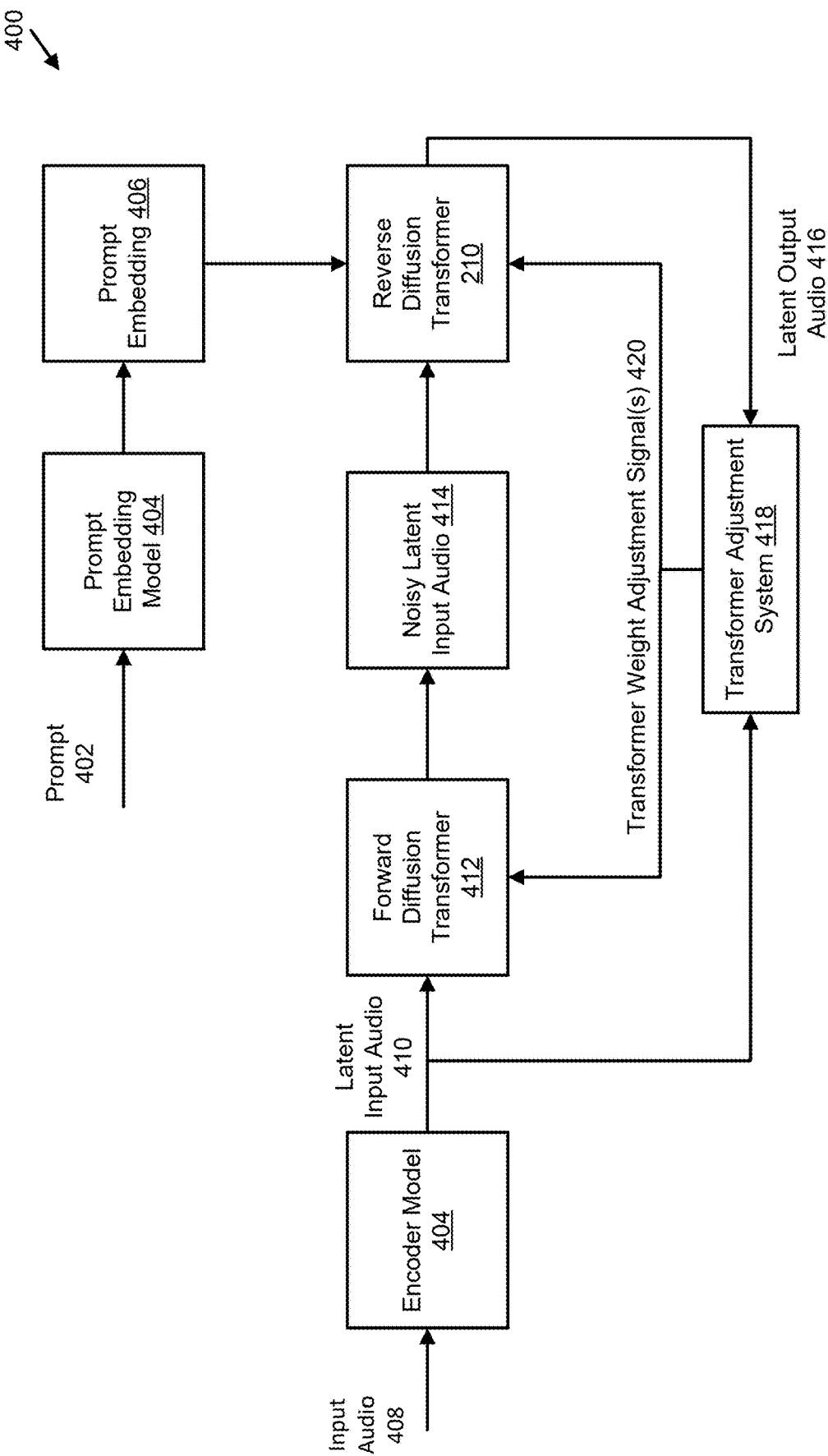
FIG. 4 illustrates an example of a system for training a diffusion transformer, according to embodiments of the present disclosure.

FIG. 4 illustrates an example of a system 400 for training a diffusion transformer model, according to embodiments of the present disclosure. The diffusion transformer model may include a forward diffusion transformer 412 (e.g., a system or a model) and a reverse diffusion transformer 210 that may be configured by a transformer adjustment system 418 during a training process. Forward diffusion transformer 412 may include a system configured to carry out a process of adding noise a latent input audio 410 (e.g., ground truth latent) to generate a noisy latent input audio 414. One the other hand, reverse diffusion transformer 210 may be configured to generate latent output audio 416 using a prompt embedding 406 and/or noisy latent input audio 414. The reverse diffusion transformer may be the reverse diffusion transformer 210 described above.

In some embodiments, the architecture of the forward diffusion transformer 412 may be similar to the architecture described above with respect to the reverse diffusion transformer model in FIG. 3 but configured to generate a noisy latent input audio 414 using latent input audio 410.

Before the reverse diffusion transformer 210 can be used during inference time, the reverse diffusion transformer 210 may first be trained to reverse noise introduced by a forward diffusion transformer 412. The forward diffusion transformer 412 may introduce noise into a latent space (e.g., latent input audio 410) so that the reverse diffusion transformer 210 can learn how to reverse the noise introduced by the forward diffusion transformer 412. Forward diffusion transformer 412 uses latent input audio 410 generated by encoding input audio 408 with encoder model 404. Latent input audio 410 may be considered as a ground truth for training purposes. Forward diffusion transformer 412 generates a progressively noisier noisy latent input audio 414 and passes the generated noisy latent input audio 414 to the reverse diffusion transformer 210 to undo the added noise and attempt to obtain the latent input audio 410 from the noisy latent input audio 414. Forward diffusion transformer 412 may add noise to the latent input audio 410 by sampling from a gaussian distribution to get a vector of the same size as latent input audio 410, then interpolating between the latent input audio 410 and the noise data based on coefficients derived from the uniformly-sampled timestep value.

Training reverse diffusion transformer 210 and/or forward diffusion transformer 412 may be carried out using a set of training data including pairs of audio (e.g., input audio 408) and prompts (e.g., prompt 402). For example, training data in the set of training data may include a prompt 402 that states "please create a happy song" and a corresponding input audio 408 that includes a happy sounding song.

In some embodiments, the prompt 402 is a text prompt and the text prompt is generated from metadata of the corresponding training data input audio 408 by concatenating a random subset of the metadata as a string. By generating text prompts in such a fashion, specific properties can be specified during inference, while not requiring these properties to be present at all times. For some (e.g., half) of the samples, metadata-type (e.g., Instruments or Moods) may be included and joined with a delimiting character (e.g., Instruments: Guitar, Drums, Bass Guitar|Moods: Uplifting, Energetic). For some samples (e.g., the other half), the metadata-type may not be included and the properties may be joined with a comma (e.g., Guitar, Drums, Bass Guitar, Uplifting, Energetic). For metadata-types with a list of values, the list may be shuffled. These transformations to the metadata for the corresponding input audio 408 and other transformations (e.g., shuffling orders and transforming between upper and lower case) can help reverse diffusion transformer 210 learn how to relate prompts 402 to noisy latent input audio 414 and generate corresponding latent output audio 416.

In some embodiments, the training dataset contains a subset of music with vocals and conditioning is not provided based on the vocals. As a result, when the model is prompted for vocals, the model's generations contain vocal-like melodies without intelligible words. In some embodiments, the training dataset contains a subset of music with vocals and conditioning is provided based on the vocals. As a result, the model can be prompted for vocals.

In some embodiments, the training set does not exclusively contain long-form music (e.g., music with a structure, music over 4 minutes in length, music over 180 seconds in length). The training set may include shorter sounds like sound effects or instrument samples. As a consequence, the audio generation system using the reverse diffusion transformer 210 can be capable of producing such sounds when prompted appropriately.

The input audio 408 and prompt 402 may each be used during the process of training reverse diffusion transformer 210. The prompts 402 included in the training data may also be used during training of the prompt embedding model 404. Similar prompt generation and transformation techniques as described above can be used to train prompt embedding model 404 (e.g., before prompt embedding model 404 is used to perform inference time computations to generate the prompt embedding 406 and/or prompt embedding 206).

The input audio 408 may be used with an encoder model 404 to generate an latent input audio 410. Forward diffusion transformer 412 may generate a noisy latent input audio 414 using the latent input audio 410. Latent input audio 410 may be received from encoder model 404. Encoder model 404 may have been trained to generate an output latent representation of input audio the encoder model 404 receives. Latent input audio 410 may be a high dimensional representation of the input audio 408. Encoder model 404 may have been pretrained for audio in general or may be trained for specific form of audio (e.g., music, sound effects, music longer than four minutes, a set of instruments, music of a specific genre or mood, etc.).

The prompt 402 included in the training data may be input to prompt embedding model 404. Prompt embedding model 404 may be the prompt embedding model 204 described above or another prompt embedding model. Prompt embedding model 404 may have been trained to generate an embedding of a prompt 402. Prompt 402 may include text, audio, video, and/or an image, etc. The prompt embedding 406 can be used by reverse diffusion transformer 210 to generate the latent output audio 416.

The noisy latent input audio 414 generated by forward diffusion transformer 412 may also be used as input to reverse diffusion transformer 210 to train reverse diffusion transformer 210 to generate a latent output audio 416 based on noisy latent input audio 414. Reverse diffusion transformer 210 may use the prompt embedding 406 and noisy latent input audio 414 to learn to recognize how a prompt 402 corresponds to the latent input audio 410 that was used to generate the noisy latent input audio 414. Reverse diffusion transformer 210 may use the prompt embedding 406 to perform conditioning (e.g., cross attention conditioning, prepended conditioning). The learning/training may be performed over many iterations. Over the iterations, parameter values of reverse diffusion transformer 210 and/or forward diffusion transformer 412 may be adjusted using transformer weight adjustment signals 420 from the transformer adjustment system 418.

Transformer adjustment system 418 may compare the latent output audio 416 generated by reverse diffusion transformer 210 and latent input audio 410 (e.g., a ground truth) to determine transformer weight adjustment signals 420 to transmit to forward diffusion transformer 412 (e.g., in embodiments where forward diffusion transformer 412 is a model) and/or reverse diffusion transformer 210. Transformer adjustment system 418 may use a loss function to compare latent input audio 410 and latent output audio 416. Transformer adjustment system 418 may transmit the transformer weight adjustment signals 420 with the goal of minimizing the loss function. The loss is used to generate gradients to train the transformer(s) during back propagation.

In some embodiments, training the transformer(s) includes pre-training the model on sequences corresponding to a maximum of 3 minutes and 10 seconds of music. The resulting model can then be fine-tuned on sequences of up to 4 minutes and 45 seconds to generate the fully trained transformer model.

Figure 5:
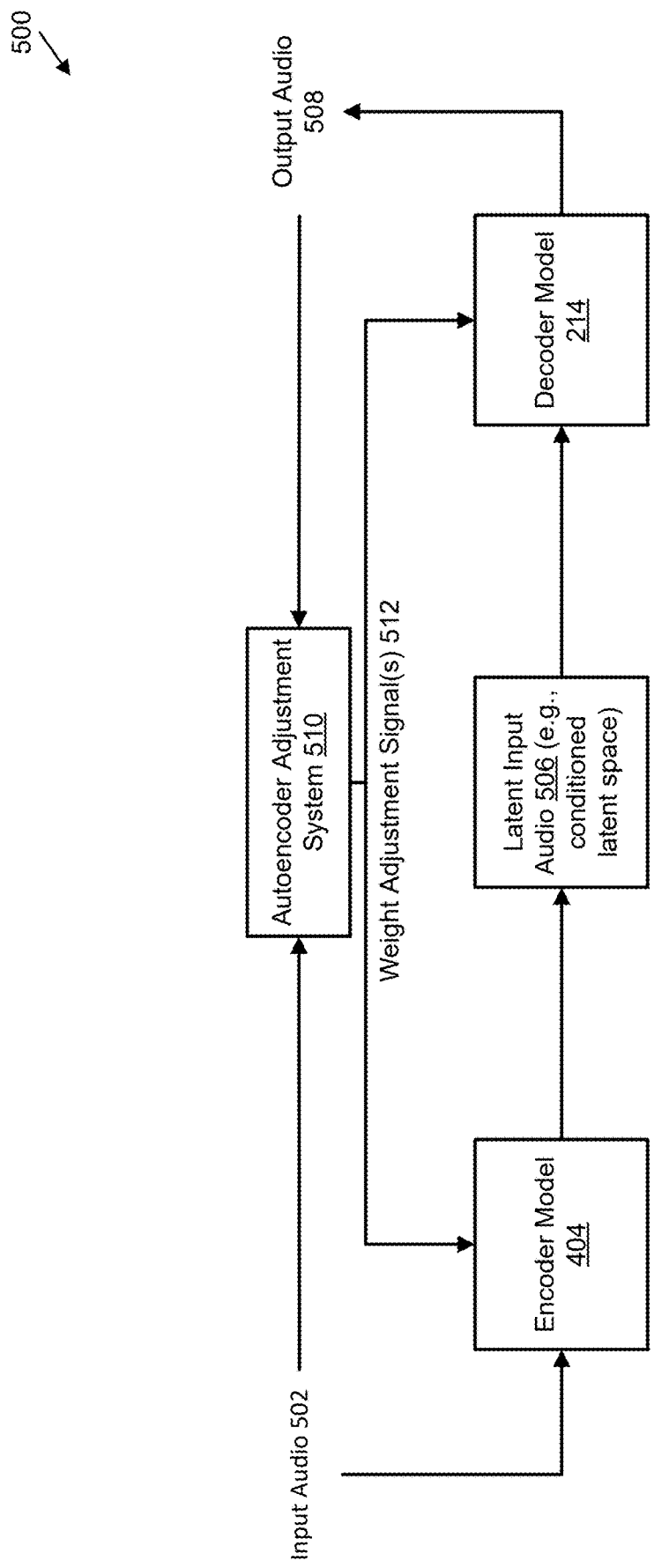
FIG. 5 illustrates an example of a system for training a decoder model, according to embodiments of the present disclosure.

FIG. 5 illustrates an example of a system 500 for training a decoder model 214, according to embodiments of the present disclosure. System 500 may include an encoder model 404, the decoder model 214, and an autoencoder adjustment system 510. Decoder model 214 and/or encoder model 404 may be trained by using the autoencoder adjustment system 510 to compare ground truth input audio 502 to output audio 508 generated by decoder model 214 and adjusting weights of the encoder model 404 and/or the decoder model 214 based on the comparison. Through training iterations, the decoder model 214 can learn to generate accurate output audio 508 using latent input audio 506. Latent input audio 506 may have the same dimensions as a conditioned latent space (e.g., conditioned latent space 212) generated by reverse diffusion transformer models described with respect to FIGS. 1-4, above, so that the decoder model 214 can generate output audio 508 using the conditioned latent space generated by reverse diffusion transformer 210.

Encoder model 404 may have been trained and/or be trained by system 500 to generate an embedding of the ground truth input audio 502. Input audio 502 may be music, a voice, an instrumental, or a sound effect, etc. Input audio 502 may include the input audio used for training described above. Encoder model 404 may be configured to operate on raw waveforms (e.g., input audio 502). Encoder model 404 may process input audio 502 by a series of convolutional blocks, each of which performs downsampling and channel expansion via strided convolutions. Before each downsampling block, a series of ResNet-like layers using dilated convolutions and Snake activation functions may be used. All convolutions may be parameterized in a weight-normalised form.

The latent input audio 506 generated by encoder model 404 may be generated at a latent rate less than 40 Hz. Latent input audio 506 may be generated at a latent rate that is the same latent rate a reverse diffusion transformer generates a latent space at.

Training of encoder model 404 may enable perceptual quality to be maintained at low latent rates (e.g., 21.5 Hz). Maintaining the perceptual quality at low latent rates can help train generative models on long temporal contexts, enabling the creation of longform music without the need to rely on semantic tokens.

Latent input audio 506 generated by encoder model 404 may be transmitted to decoder model 214 to be used as input to decoder model 214. Decoder model 214 may be trained by system 500 to output a generated audio file 216 including output audio based on latent input audio 506 (e.g., an encoding of the ground truth input audio 502). Output audio may include music, a voice, an instrumental, or a sound effect, etc. Decoder model 214 may be configured to operate on latent input audio 506 of raw waveforms. Decoder model's 214 architecture may be similar to encoder model's 404 architecture, but employ transposed strided convolutions for upsampling and channel contraction at the start of each upsampling block. Decoder model's 214 architecture is further described above with respect to FIG. 3.

The autoencoder adjustment system 510 can use output audio 508 and input audio 502 (a ground truth) to determine weight adjustment signals 512 to send to encoder model 404 and/or decoder model 214. Autoencoder adjustment system 510 may transmit the weight adjustment signals 512 with the goal of reducing a loss function.

In some embodiments, a short time Fourier transform (STFT) loss function is used. For example, autoencoder adjustment system 510 may use a reconstruction loss, consisting of a perceptually weighted multi-resolution STFT loss that deals with stereo signals. The STFT loss may be applied to a mid-side (M/S) representation of stereo audio, as well as the left and right channels separately. The result can be down-weighted by 0.5 compared to the M/S component, and mitigate potential ambiguity around left-right placement. In some embodiments, a MEL distance and/or SI-SDR are used to evaluate the performance of the encoder model 404 and/or the decoder model 214.

In some embodiments, an adversarial loss term is used by the autoencoder adjustment system 510, utilizing a convolutional discriminator model. The discriminator model may include hyperparameters. The discriminator model may scale the parameter count with channel count and may have about 4 times the parameter count of other discriminator models.

Figure 6:
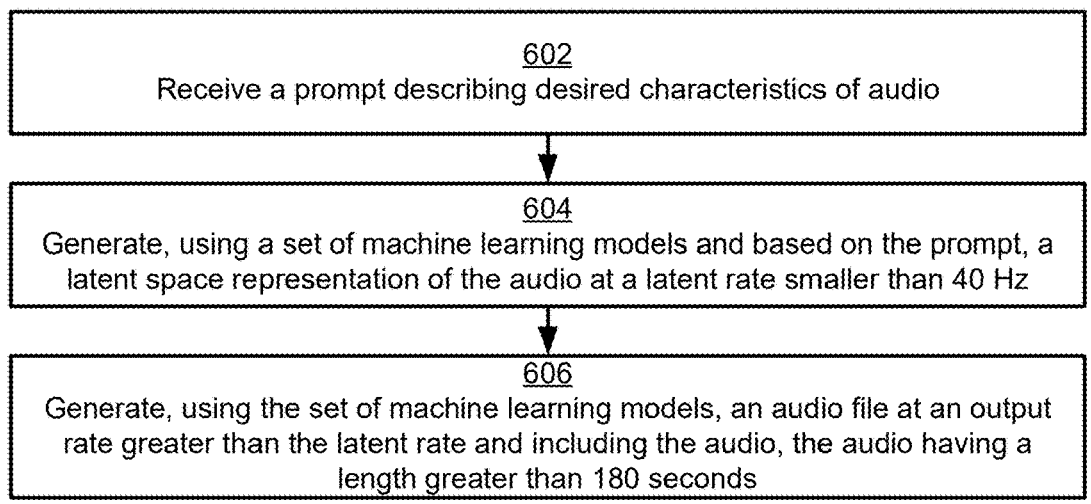
FIG. 6 illustrates an example of a process for using an audio generation system, according to embodiments of the present disclosure.

FIG. 6 illustrates an example of a process 600 for using an audio generation system (e.g., the audio generation system 108 described above), according to embodiments of the present disclosure.

At step S602, a prompt (e.g., prompt 202) may be received by the audio generation system. The prompt may be received from a computing system (e.g., computing system 104). The prompt may describe desired characteristics of audio to be generated by the audio generation system. For example, the desired characteristics may include a length, a structure, a genre, a mood, instruments to be included, etc. The prompt may include example audio, images, video, and/or voice to be used as inspiration for generated audio. The prompt may include audio to be added to and/or altered by the audio generation system.

At step S604, a latent space representation (e.g., a conditioned latent space) of the audio to be generated by the audio generation system is generated. The latent space representation may be generated using a set of machine learning models and be based on the prompt. The set of machine learning models may include at least one of an embedding model (e.g., a contrastive text-audio embedding model, e.g., prompt embedding model 204) used to generate an embedding (a latent space representation) of the prompt.

The set of machine learning model may include a latent diffusion model (e.g., reverse diffusion transformer 210). The latent diffusion model may include a reverse diffusion transformer model that has been trained to generate a conditioned embedding using an embedding of the prompt and a noisy latent space. The conditioned latent space may be generated at a latent rate of less than 40 Hz.

At step S606, using the set of machine learning models, output audio included in an output audio file may be generated. The output audio may have a structure which may include an intro, a verse, a pre-chorus, a chorus, a bridge, a hook, a refrain, an instrumental break, and/or an outro. The output audio may include music, a voice, an instrumental, and/or a sound effect. The output audio may include one or more channels that are represented independently of the other channels, as described above. The output audio may have a length greater than 180 seconds. In some embodiments, the output audio may have a length greater than 240 seconds.

The set of machine learning models may include a decoder model (e.g., decoder model 214). The decoder model may have been trained to decode an embedding (e.g., with specific dimensions and a specific latent rate or range of latent rates) generated by the latent diffusion model to generate output audio to be included in an output audio file. The output rate of the audio may be greater than the latent rate of the embedding input to the decoder model.

In some embodiments, after the first output audio file is generated, a subsequent prompt may be received by the audio generation system that causes a second output audio file to be generated that is different than the first and that is based on the first prompt and/or the first output audio file. For example, the second prompt may ask that more bass be added, the style changed, or a channel of the audio file be changed. In such embodiments, the reverse diffusion transformer may run the conditioned latent space in the opposite direction from which it was generated (e.g., run the diffusion process "forward") and go from the conditioned latent space to the noisy latent space.

As a further example, the first audio file generated based on the first prompt may include a first channel represented independently of a second channel, and the second channel represented independently of the first channel. The first audio file may be transmitted to the computing device the first prompt was received from before the computing device transmits a second prompt to the audio generation system describing how the first channel of the audio file should be different. The audio generation system may then use the set of machine learning models and the second prompt to generate a second latent space representation of second audio and generate the second audio file with a different first channel than the first audio file.

Figure 7:
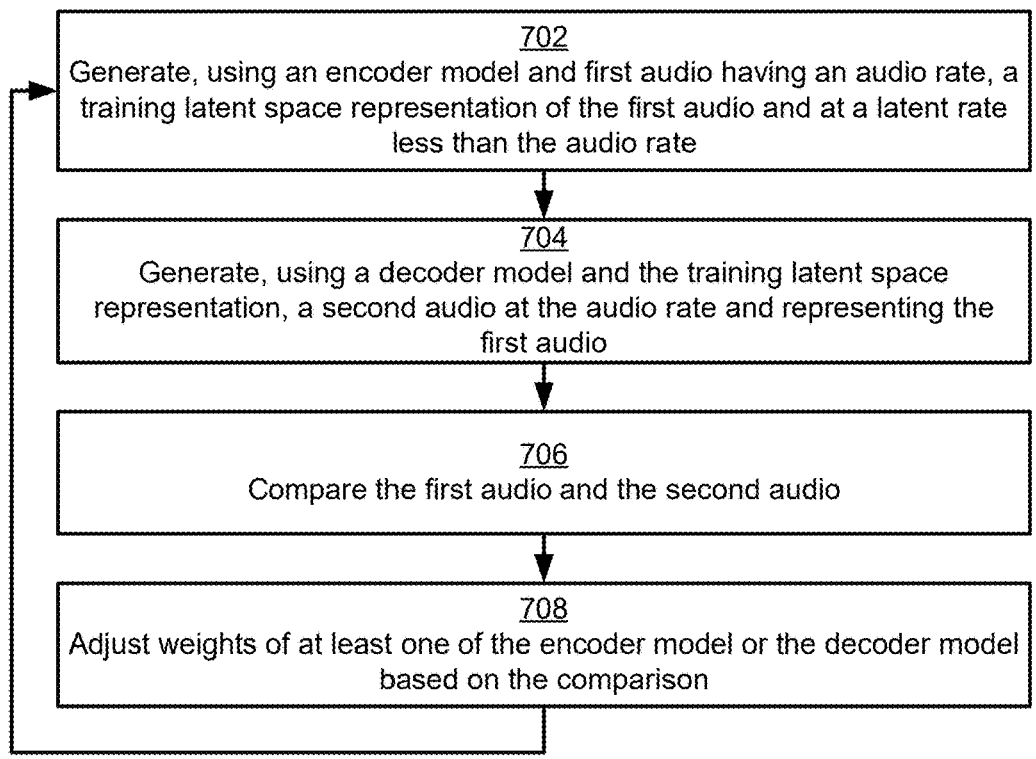
FIG. 7 illustrates an example of a process for training a decoder model, according to embodiments of the present disclosure.

FIG. 7 illustrates an example of a process 700 for training a decoder model (e.g., decoder model 214), according to embodiments of the present disclosure. The decoder model may be trained using the system described with respect to FIG. 5, above.

At step S702, an encoder model (e.g., encoder model 404) may receive first audio (input audio) to be used to generate a corresponding latent space representation of the first audio. The first audio may have a first audio rate. In some embodiments, the first audio rate is above 40 kHz. The first audio may be from the training data described above (e.g., audio corresponding to prompts). The first audio may include audio with one or more genres, moods, lengths, structures, etc. In some embodiments, the audio is above a certain length (e.g., at least 180 seconds, above 240 seconds). The latent space representation of the first audio may be generated at a latent rate less than the first audio rate and/or an output audio rate to be generated by the decoder model.

At step S704, the decoder model may be used to generate the output audio using the latent space representation of the first audio. As described above, the decoder model may generate the output audio at an output rate (e.g., 40 kHz) greater than the latent rate output by the encoder model. The decoder model may be trained to generate audio at a rate the same as the encoder model is configured to receive as input. The decoder model may be trained to receive the latent space representation of the first audio at a latent rate that is the same as a latent rate output by a reverse diffusion model (e.g., reverse diffusion transformer 210 described above).

At step S706, the output audio generated by the decoder model may be compared (e.g., using an autoencoder adjustment system 510) to the first audio input to the encoder model to determine how similar the audios are to each other. The comparison may be performed using a loss function (e.g., STFT loss). Additionally or alternatively, the comparison may be performed using a discriminator model, each of which have been described in further detail above.

At step S708, the weights of the encoder model and/or the decoder model may be adjusted based on the comparison performed at step S706. The weight adjustment may be performed with the goal of minimizing the loss function or otherwise causing the output audio to be more similar to the first audio.

Steps S702-S708 may be repeated over a number of training epochs to train or fine tune the decoder model and/or the encoder model. After the decoder model is trained, the trained decoder model may be used during inference time to generate output audio based on a prompt (e.g., as part of audio generation system 108). In some embodiments, after the encoder model is trained using the above process, the encoder model is used during the training process of the diffusion transformer model.

Figure 8:
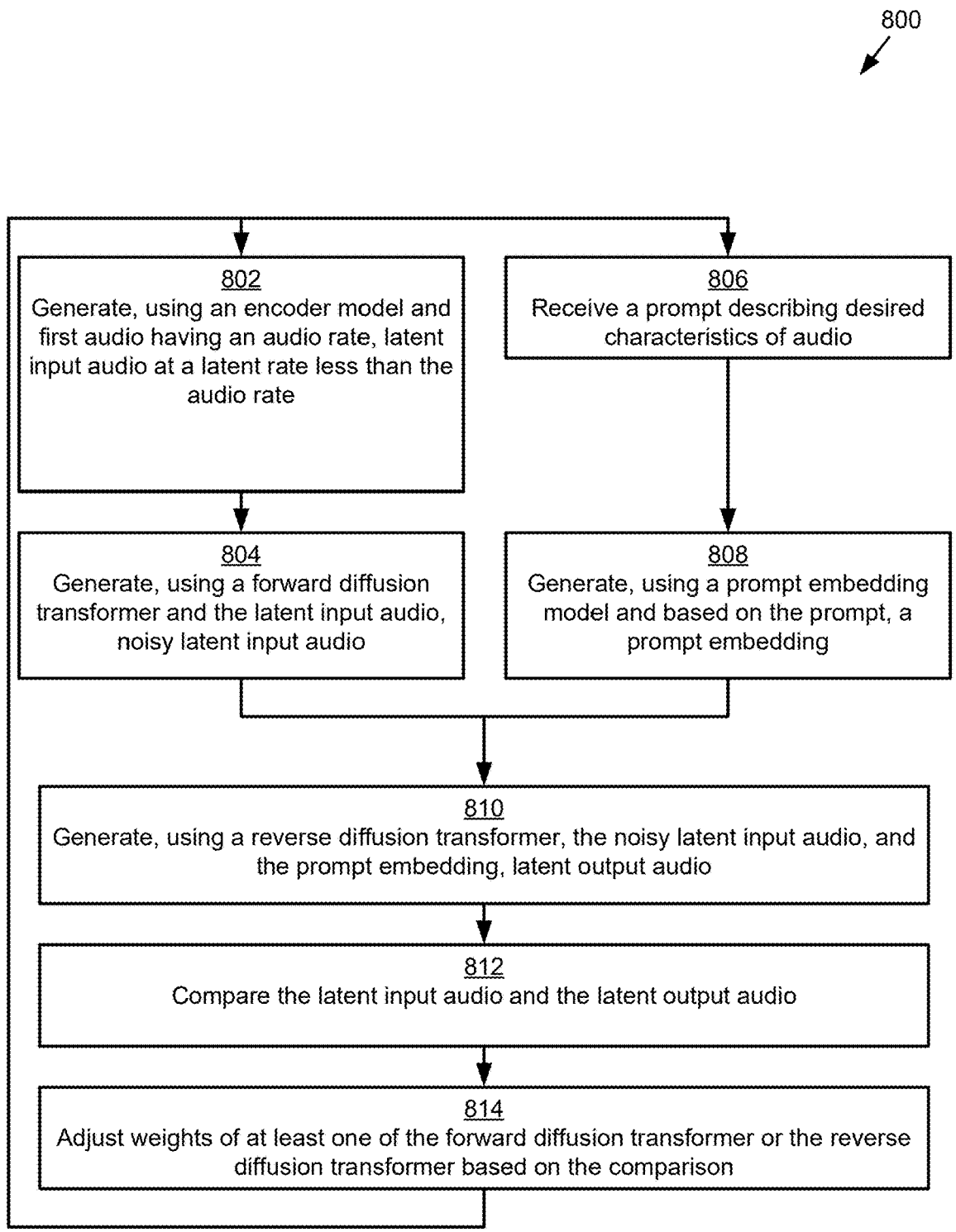
FIG. 8 illustrates an example of a process for training a diffusion transformer model, according to embodiments of the present disclosure.

FIG. 8 illustrates an example of a process 800 for training a diffusion transformer model, according to embodiments of the present disclosure. The diffusion transformer model may include a forward diffusion transformer (e.g., forward diffusion transformer 412) and a reverse diffusion transformer (e.g., reverse diffusion transformer 210). The reverse diffusion transformer may be used during inference time by the audio generation system (e.g., audio generation system 108) described above.

At step S802, first audio may be received by an encoder model (e.g., encoder model 404) and the encoder model may generate latent input audio of the first audio. The first audio may have a first audio rate. In some embodiments, the first audio rate is above 40 kHz. The first audio may be from the training data described above (e.g., audio corresponding to prompts). The first audio may include audio with one or more genres, moods, lengths, structures (e.g., including two or more of: an intro, a verse, a pre-chorus, a chorus, a bridge, a hook, a refrain, an instrumental break, or an outro), etc. In some embodiments, the audio is above a certain length (e.g., at least 180 seconds, above 240 seconds). The latent input audio of the first audio may be generated at a latent rate (e.g., 40 Hz) less than the first audio rate and/or an output audio rate to be generated by the decoder model.

At step S804, the latent input audio of the first audio may be input to a forward diffusion transformer to cause the forward diffusion transformer to generate a noisy latent input audio (e.g., noisy latent input audio 414). The forward diffusion transformer may generate the noisy latent input audio at a latent rate that is equal to the latent rate generated by a prompt embedding model described below and/or the latent rate the reverse diffusion transformer is capable of receiving.

At step S806, a prompt (e.g., prompt 402) corresponding (e.g., describing attributes of the first audio) to the first audio (e.g., input audio 408) may be received for use at step S808. The prompt may be included in a set of training data. The set of training data may be the same set of training data used by the encoder model at step S802. In some embodiments, the prompt describes desired characteristics of audio to be generated. For example, the desired characteristics may include a length, a structure, a genre, a mood, instruments to be included, etc. The prompt may include audio, images, video, and/or voice to be used as inspiration for generated audio. The prompt may include audio to be added to and/or altered by the audio generation system.

At step S808, the prompt may be used by a prompt embedding model to generate a prompt embedding. In some embodiments, the prompt embedding has the same dimensions as the noisy latent input audio generated at step S804. The prompt embedding model may be a contrastive text-audio embedding model.

At step S810, the prompt embedding generated at step S808 and the noisy latent input audio generated at step S804 may be input to a reverse diffusion transformer. The reverse diffusion transformer may use the inputs to generate a latent output audio (e.g., latent output audio 416). The reverse diffusion transformer may use the inputs to condition the performance of the reverse diffusion transformer as described above (e.g., with respect to FIG. 2-4). The reverse diffusion transformer may be configured to output latent output audio in a conditioned latent space. The generated latent output audio may be generated at a latent rate less than 40 Hz and may be representative of the input audio with a rate (e.g., 40 kHz) greater than the latent rate.

At step S812, the latent output audio generated at step S810 may be compared to the latent input audio generated at step S802. The comparison may be performed by a transformer adjustment system (e.g., transformer adjustment system 418). A loss function may be used to compare the latent input audio and the latent output audio.

At step S814, a transformer weight adjustment signal may be transmitted to the forward diffusion transformer in embodiments where the forward diffusion transformer is a model and/or the reverse diffusion transformer (e.g., by the transformer adjustment system) based on the comparison performed at step S812. Step 814 may be referred to as back propagation. Step S814 can be performed in an effort to minimize a loss function used during the training process 800 and thereby increase the reverse diffusion transformer's accuracy.

Steps S802-S814 may be repeated over a number of training epochs to train or fine tune the reverse diffusion transformer and/or forward diffusion transformer. As training continues, the noisy latent input audio generated by the forward diffusion transformer may become progressively noisier (e.g., such that the noise becomes closer to representing a gaussian distribution). As training continues, the reverse diffusion transformer may become more accurate at correctly generating latent output audio based on the noisy latent input audio and prompt it receives as input. After the reverse diffusion transformer is trained, the trained reverse diffusion transformer may be used during inference time to generate output audio based on a prompt (e.g., as part of audio generation system 108).

As a result of the training process, the audio generation system can obtain high audio quality and text-prompt coherence. Additionally, the audio generation model is also capable of generating long-form music with coherent structure. The long form audio generation can be performed in a relatively short amount of time (e.g., in 13 seconds on a GPU). Furthermore, the long generated long form audio may include a structure that is not otherwise obtained on shorter form music or by models that have not been trained on long form audio. The models herein can be trained on long-form audio because of the small latent rate compared to the audio rate. Described embodiments can avoid the use of semantic tokens when generating music with structure, as the structure can emerge through training with long contexts.

Figure 9:
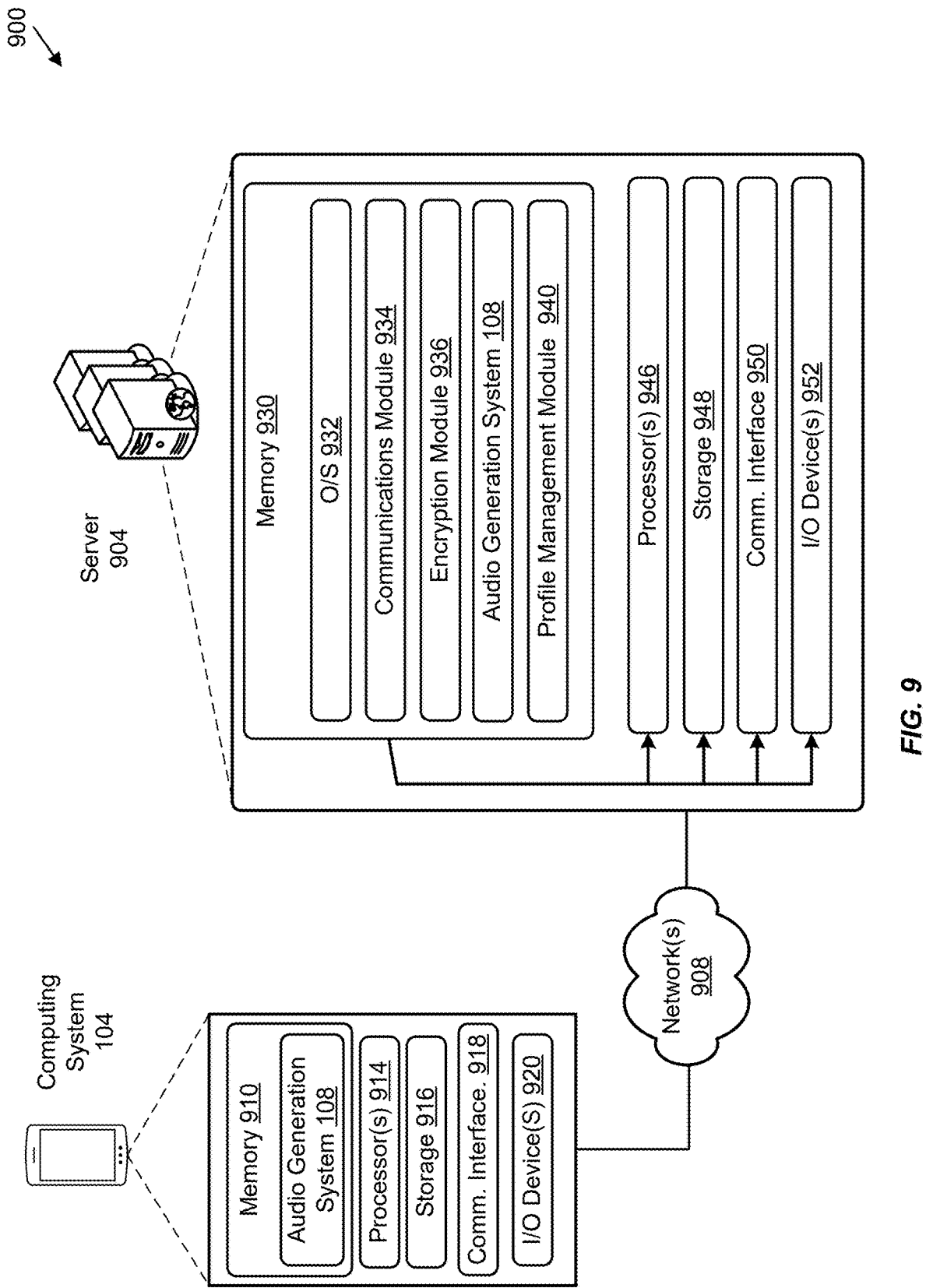
FIG. 9 is a simplified block diagram illustrating an example architecture of a system used to train and/or use the models and systems described herein, according to some embodiments.

FIG. 9 is a simplified block diagram illustrating an example architecture of a system 900 used to train and/or use the models and systems described herein, according to some embodiments.

The system 900 includes a computing system 104, a network 908, and a server 904. The computing system 104 may be similar to any of the user devices and/or computing systems described herein. The server 904 may correspond to one or more server computers (e.g., a server cluster) of a cloud computing platform, as described herein.

The network 908 may include any suitable communication path or channel such as, for instance, a wire or cable, fiber optics, a telephone line, a cellular link, a radio frequency (RF) link, a WAN or LAN network, the Internet, or any other suitable medium. The network 908 may include any one or a combination of many different types of networks, such as cable networks, the Internet, wireless networks, cellular networks, and other private and/or public networks. The network may use infrared, ultra-wideband (UWB), Bluetooth (BT), Bluetooth low energy (BTLE), Wi-Fi, and/or radio communication techniques.

Turning to each element in further detail, the computing system 104 may be any suitable computing device (e.g., a mobile phone, tablet, personal computer (PC), smart glasses, a smart watch, etc.). The computing system 104 has at least one memory 910, one or more processing units (or processor(s)) 914, a storage unit 916, a communications interface 918, and an input/output (I/O) device(s) 920.

The processor(s) 914 may be implemented as appropriate in hardware, computer-executable instructions, firmware or combinations thereof. Computer-executable instruction or firmware implementations of the processor(s) 914 may include computer-executable or machine executable instructions written in any suitable programming language to perform the various functions described.

The memory 910 may store program instructions that are loadable and executable on the processor(s) 914, as well as data generated during the execution of these programs. Depending on the configuration and type of computing system 104, the memory 910 may be volatile (such as random access memory (RAM)) and/or non-volatile (such as read-only memory (ROM), flash memory, etc.). In some implementations, the memory 910 may include multiple different types of memory, such as static random access memory (SRAM), dynamic random access memory (DRAM) or ROM. The computing system 104 may also include additional storage 916, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 916 may be utilized to store audio files, video, images, voices, and/or text files.

The computing system 104 may also contain the communications interface 918 that allows the user device 902 to communicate with the server, user terminals, and/or other devices on the network(s) 908. The computing system 104 may also include I/O device(s) 920, such as for enabling connection with a keyboard, a mouse, a pen, a voice input device, a touch input device, a display, speakers, a printer, and/or other components the computing system 104 may include.

Turning to the contents of the memory 910 in more detail, the memory 910 may include an operating system and one or more application programs or services for implementing the features disclosed herein, including an audio generation system 108 or a system for training one or more of the models used in the audio generation system 108.

It should be understood that one or more functions of the audio generation system 108 may be performed by the computing system 104 and/or server 904.

In some embodiments, as described above the remote server 904 may correspond to a cloud computing platform. The remote server 904 may perform one or more functions, including, for example: receiving a prompt from the computing system 104, generating output audio based on the prompt and using a set of machine learning models, and/or transmitting the generated output audio to the computing system 104. The remote server 904 may include a credential generation module, I/O devices, and/or communications interfaces, etc.

Turning to the contents of the memory 930 in more detail, the memory 930 may include an operating system 932 and one or more application programs or services for implementing the features disclosed herein, including a communications module 934, an encryption module 936, the audio generation system 108, and/or a profile management module 940.

The communications module 934 may comprise code that causes the processor 946 to receive prompts, generate embeddings, train models, transmit audio, and/or otherwise communicate with other system components. For example, the communications module 934 may receive prompts and transmit audio files to the computing system 104.

The encryption module 936 may comprise code that causes the processor 946 to encrypt and/or decrypt messages. For example, the encryption module 936 may receive encrypted data (e.g., prompts) from the computing system 104. The encryption module 936 may include any suitable encryption algorithms to encrypt data. Suitable data encryption algorithms may include Data Encryption Standard (DES), tripe DES, Advanced Encryption Standard (AES), etc. It may also store (e.g., in storage unit 948) encryption keys (e.g., encryption and/or decryption keys) that can be used with such encryption algorithms. The encryption module 936 may utilize symmetric or asymmetric encryption techniques to encrypt and/or verify data. For example, the computing system 104 may contain similar code and/or keys as encryption module 936 that is suitable for encrypting/decrypting data communications with the computing system 104 (and/or server 904).

The profile management module 940 may comprise code that causes the processor 946 to maintain and store profiles of users and/or user devices. For example, the profile management module 940 may receive users and/or devices allowed to use the audio generation system 108 and/or train the audio generation system 108. The profile management module 940 may keep track of users and/or devices associated with prompts and/or output audio so that when the users and/or devices use the server 904 again, the prompts and/or output audio can be transmitted to the users and/or devices (e.g., displayed as an audio generation history). The profile management module 940 may also include information relating to which users and/or user devices have what permissions, etc.

The processing depicted in FIGS. 6-8 (and/or described with respect to FIGS. 1-5), and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented herein are intended to be illustrative and non-limiting. Although FIGS. 6-8, and other FIGURES, depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIGS. 6-8, and other FIGS. may include a greater number or a lesser number of steps than those depicted in the respective FIGS.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing programs/code, or portions of programs/code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more storage media storing instructions; and
   one or more processors configured to execute the instructions to cause the system to:
      receive a prompt describing desired characteristics of audio;
      generate, using a set of machine learning models and based on the prompt, a latent space representation of the audio at a latent rate less than 40 Hz; and
      generate, using the set of machine learning models and the latent space representation of the audio, an audio file at an output rate of at least 40 kHz and including the audio based on the latent space representation of the audio, the audio having a length greater than 90 seconds.

2. The system of claim 1, wherein the latent rate is between 20 Hz and 25 Hz.

3. The system of claim 1, wherein the set of machine learning models includes a text embedding model, a latent diffusion model, and a decoder model.

4. The system of claim 3, wherein generating using the set of machine learning models comprises:
   generating, using the text embedding model, a second latent space representation of the prompt;
   generating, using the latent diffusion model, the latent space representation of the audio using the second latent space representation of the prompt; and
   generating, by at least using the decoder model and the latent space representation of the audio, the audio.

5. The system of claim 1, wherein the audio represented by the audio file has a structure, the structure including at least two of the following: an intro, a verse, a pre-chorus, a chorus, a bridge, a hook, a refrain, an instrumental break, or an outro.

6. The system of claim 1, wherein the set of machine learning models includes a decoder model trained to generate the audio at the output rate using the latent space representation of the audio at the latent rate of 21.5 Hz.

7. The system of claim 1, wherein the prompt includes at least one of: text, audio, image, or video.

8. The system of claim 1, wherein the audio represented by the audio file includes at least one of: music, voice, an instrumental, or a sound effect.

9. The system of claim 1, wherein the audio file includes one or more channels that are represented independently of the other channels.

10. The system of claim 1, wherein the set of machine learning models includes a diffusion model trained using structured audio including at least two of the following: an intro, a verse, a pre-chorus, a chorus, a bridge, a hook, a refrain, an instrumental break, or an outro.

11. A computer-implemented method comprising:
receiving a prompt describing desired characteristics of audio;
    generating, using a set of machine learning models and based on the prompt, a latent space representation of the audio at a latent rate less than 40 Hz; and
    generating, using the set of machine learning models and the latent space representation of the audio, an audio file at an output rate of at least 40 kHz and including the audio based on the latent space representation of the audio, the audio having a length greater than 90 seconds.

12. The computer-implemented method of claim 11, further comprising:
transmitting the audio file to a user device, the audio file including a first channel represented independently of a second channel, and the second channel represented independently of the first channel;
receiving, from the user device, a second prompt describing how the first channel of the audio file should be different;
generating, using the set of machine learning models and based on the second prompt, a second latent space representation of the audio at the latent rate; and
generating, using the set of machine learning models and the second latent space representation of the audio, a different first channel audio file at the output rate.

13. The computer-implemented method of claim 11, wherein all portions of the audio correspond uniquely to a respective portion of the latent space representation.

14. The computer-implemented method of claim 11, wherein the set of machine learning models includes a diffusion model trained using second audio with the length.

15. The computer-implemented method of claim 11, wherein the audio represented by the audio file has a structure, the structure including at least two of the following: an intro, a verse, a pre-chorus, a chorus, a bridge, a hook, a refrain, an instrumental break, or an outro.

16. One or more non-transitory computer-readable storage media storing instructions that, upon execution executable by one or more processors of a system, cause the system to perform operations comprising:
receiving a prompt describing desired characteristics of audio;
generating, using a set of machine learning models and based on the prompt, a latent space representation of the audio at a latent rate less than 40 Hz; and
generating, using the set of machine learning models and the latent space representation of the audio, an audio file at an output rate of at least 40 kHz and including the audio based on the latent space representation of the audio, the audio having a length greater than 90 seconds.

17. The non-transitory computer-readable storage medium of claim 16, wherein the set of machine learning models includes a decoder model and was trained by operations comprising:
generating, using an encoder model and second audio having the output rate, a training latent space representation of the second audio and at the latent rate;
generating, using a previous configuration of the decoder model and the training latent space representation, a third audio at the output rate and representing the second audio;
comparing the second audio and the third audio; and
adjusting weights of at least one of the encoder model or the decoder model based on the comparing.

18. The non-transitory computer-readable storage medium of claim 16, wherein the latent rate is between 20 Hz and 25 Hz.

19. The non-transitory computer-readable storage medium of claim 16, wherein the set of machine learning models includes a diffusion model trained using structured audio with the length.

20. The non-transitory computer-readable storage medium of claim 16, wherein the audio represented by the audio file has a structure, the structure including at least two of the following: an intro, a verse, a pre-chorus, a chorus, a bridge, a hook, a refrain, an instrumental break, or an outro.

* * * * *